Patented Dec. 15, 1936

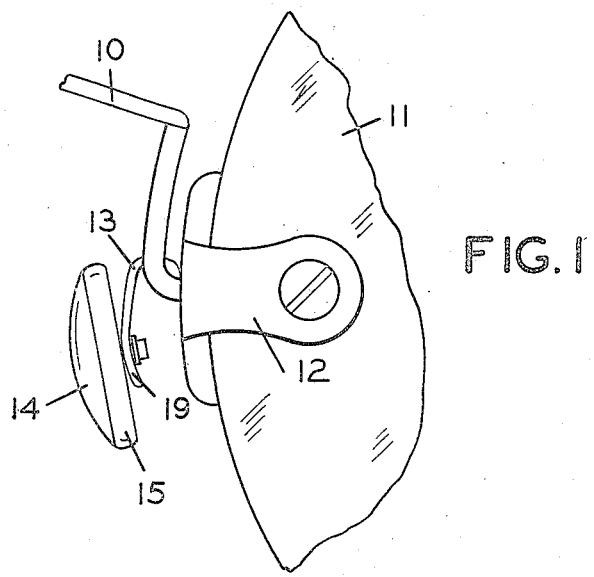
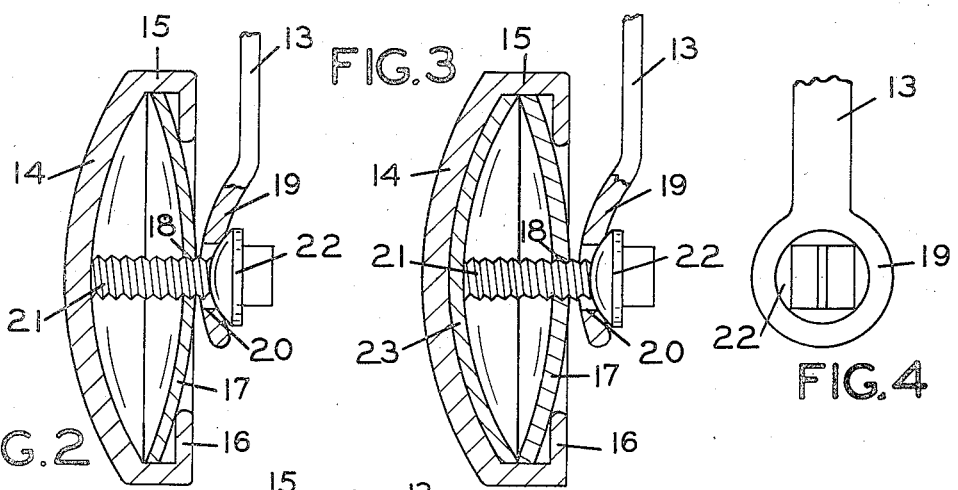
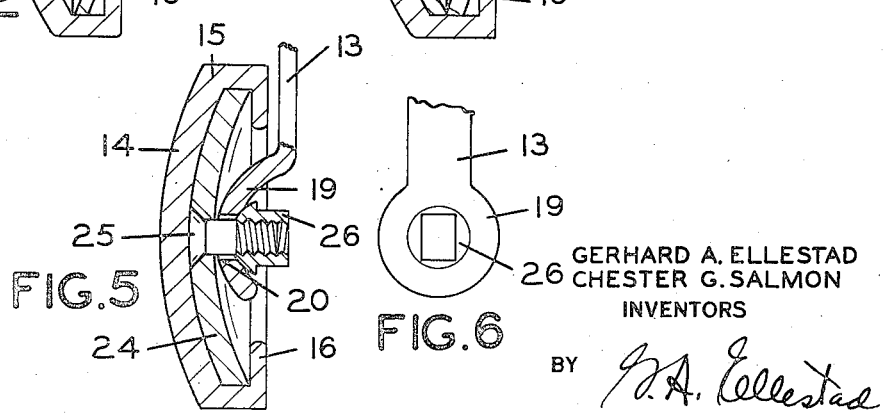

2,064,376

UNITED STATES PATENT OFFICE 2,064,376

OPHTHALMIC MOUNTING

Gerhard A. Ellestad, Rochester, and Chester G. Salmon, Greece, N. Y., assignors to Bausch & Lomb Optical Company, Rochester, N. Y., a corporation of New York Application March 28, 1935, Serial No. 13,420

2 Claims. (Cl. 88—49)

The present invention relates to ophthalmic mountings and more particularly to nose engaging members which are known as nose pads or guards.

In the making of spectacles having rockable nose pads or guards, it has been the general practice to attach the pad loosely but permanently to the pad holding arm. Thus, when a pad was damaged or broken, it was usually necessary to remove the pad holding arm from the spectacle mounting and substitute an entire new arm and pad assembly. With some types of bridge even this form of repair was impossible and an entire new bridge was necessary. Such repairs were necessarily laborious and expensive.

One of the objects of this invention is to provide an improved nose pad for an ophthalmic mounting. Another object is to provide an improved rockable mounting for a nose pad. A further object is to provide an improved ophthalmic mounting from which the nose pad may be readily and easily attached or removed. These and other objects and advantages reside in certain novel features of construction, arrangement and combination of parts as will hereinafter be more fully set forth and pointed out in the appended claims.

Referring to the drawing:

Fig. 1 is a fragmentary view of an ophthalmic mounting embodying this invention.

Fig. 2 is a sectional view showing one form of nose pad connection.

Fig. 3 is a sectional view showing another form of nose pad connection.

Fig. 4 is a rear view of the pad holding arm and connection shown in Figs. 2 and 3.

Fig. 5 is a sectional view showing a third form of nose pad connection.

Fig. 6 is a rear view of the pad holding arm and connection shown in Fig. 5.

In the drawing 10 designates a spectacle bridge secured to a lens 11 by a mounting 12. A pad holding arm 13 is fixed at one end to the mounting 12 and, at the other end, rockably supports the nose engaging member or nose pad 14.

Referring to the embodiment shown in Fig. 2, the nose pad 14 has a recess formed by the wall 15 and the recess is partially closed by the overhanging flange 16. A thin and preferably metallic plate 17, larger than the opening formed by the flange 16, is positioned within the recess and is provided with a threaded opening 18. Adjacent its end, the pad holding arm 13 is provided with a convex portion 19 having an aperture 20. A screw 21 having a convex head 22 larger than the aperture 20, is passed through the aperture 20 and threaded into the opening 18. In its extreme position, the screw 21 bears against the nose pad 14 tending to flex the plate 17 outwardly into a convex form and is thus held rigid with the nose pad. The convex portion 19 of the arm 13 bears against the convex plate 17 and thus a free rocking movement is provided.

The nose pad 14 may be composed of metal or may be made of a non-metallic substance such as celluloid or zylonite. When a relatively soft substance such as celluloid or zylonite is used, the screw 21, would tend to injure the nose pad 14 and in this case a metallic bearing plate 23 is provided as shown in Fig. 3. The plate 23 lies close against the nose pad 14 and the screw 21 presses against this plate.

In the form illustrated in Figs. 5 and 6, a relatively heavy metallic plate 24 is positioned within the recess in the pad 14 and held in place by the flange 16. A screw 25 is fixed in the plate 24 and the apertured convex portion 19 of the arm 13 is held on the screw 25 by a nut 26.

From the foregoing it will be apparent that we are able to attain the objects of our invention and provide a new and improved nose pad and a new and improved mounting for same so that the nose pad may be readily and inexpensively removed and replaced. Various modifications can, of course, be made without departing from the spirit of our invention.

We claim:

1. In an ophthalmic mounting, a nose pad having a recess and a flange overhanging said recess, two metallic plates larger than the opening in said flange positioned within said recess, a screw threaded in the outer plate and bearing against the inner plate, a pad holding arm having an aperture for loosely engaging said screw and means on said screw for preventing removal of said arm.

2. In an ophthalmic mounting, a nose pad having a recess and a flange overhanging said recess, a plate larger than the opening in said flange positioned within said recess, a screw threaded in said plate and bearing against said nose pad, a pad holding arm having an aperture for loosely engaging said screw and means on said screw for preventing withdrawal of said arm.

GERHARD A. ELLESTAD.
CHESTER G. SALMON.